UNITED STATES PATENT OFFICE.

AUGUST KIESELE, OF NEW YORK, N. Y.

IMPROVEMENT IN COMPOSITIONS FOR CASTING ORNAMENTAL FIGURES.

Specification forming part of Letters Patent No. 190,769, dated May 15, 1877; application filed March 3, 1877.

*To all whom it may concern:*

Be it known that I, AUGUST KIESELE, of the city, county, and State of New York, have invented a new and Improved Composition for Casting, of which the following is a specification:

My invention relates to a compound for casting ornamental figures; and it consists in a composition formed by the admixture of dry pulverized sugar, melted paraffine, and stearine.

To prepare the composition, I melt together one pound of paraffine and four ounces of stearine, and add twelve ounces of dry pulverized sugar, and stir it thoroughly until the sugar is completely mixed with the paraffine and stearine.

To make ornamental figures, I pour this composition into molds and allow it to cool, and then remove the article from the mold, and dust powdered starch or sugar over it to destroy the gloss and give it the appearance of alabaster.

This composition runs sharp and smooth in the mold, and, when cold, has the translucent appearance of alabaster.

Having thus described my invention, I claim as new and desire to secure by Letters Patent—

A composition for casting, consisting of paraffine and stearine and pulverized sugar, in about the proportions substantially as and for the purpose described.

AUGUST KIESELE.

Witnesses:
   C. SEDGWICK,
   ALEX. F. ROBERTS.